United States Patent
Zhang et al.

(10) Patent No.: US 9,335,175 B2
(45) Date of Patent: May 10, 2016

(54) CROWD-SOURCING INDOOR LOCATIONS

(75) Inventors: Faen Zhang, Beijing (CN); Edward Y. Chang, Palo Alto, CA (US); Yongqiang Huang, Los Altos, CA (US); Shuchang Zhou, Beijing (CN)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/357,012

(22) PCT Filed: Aug. 15, 2012

(86) PCT No.: PCT/CN2012/080177
§ 371 (c)(1),
(2), (4) Date: May 20, 2014

(87) PCT Pub. No.: WO2014/026338
PCT Pub. Date: Feb. 20, 2014

(65) Prior Publication Data
US 2015/0204676 A1     Jul. 23, 2015

(51) Int. Cl.
*G01C 21/30*     (2006.01)
*G01C 21/20*     (2006.01)
*G01S 5/02*      (2010.01)
(Continued)

(52) U.S. Cl.
CPC ............. *G01C 21/206* (2013.01); *G01S 5/0252* (2013.01); *G01S 5/0263* (2013.01); *G01S 5/0294* (2013.01); *H04W 4/027* (2013.01); *H04W 4/043* (2013.01)

(58) Field of Classification Search
CPC .... G01C 21/206; G01C 21/20; G05D 1/0274; H04W 64/00; H04W 4/043

USPC .................................................. 701/400–410
See application file for complete search history.

(56) References Cited

U.S. PATENT DOCUMENTS 7,250,907 B2 *   7/2007   Krumm .............. G01C 21/206
                                              342/451
8,825,388 B2 *   9/2014   Khorashadi ........ G01C 21/206
                                              701/26
(Continued)

FOREIGN PATENT DOCUMENTS

CN      102521328 A      6/2012
WO      2007068107 A1    6/2007
(Continued)

OTHER PUBLICATIONS

Using Unlocated Fingerprints in Generation of WLAN Maps for Indoor Positioning Position Locaiton and Navigation Symposium (PLANS)2012 ISBN:978-1-4673-0385-9.*

(Continued)

*Primary Examiner* — Shardul Patel
(74) *Attorney, Agent, or Firm* — Lerner, David, Littenberg, Krumholz & Mentlik, LLP

(57) ABSTRACT

Aspects of the present disclosure provide techniques for constructing a scalable model of an indoor space using crowd-sourced inertial navigation system (INS) signals from mobile devices. By tracking INS signals from a number of participating users, the user's trajectories can be estimated as they move their mobile devices indoors. The estimated trajectories can be scored against similar routes taken by other users. Routes with the highest scores are then laid out over a map of the indoor space to identify areas most often traveled to and from landmarks and distances between the landmarks.

20 Claims, 10 Drawing Sheets

(51) Int. Cl.
*H04W 4/02* (2009.01)
*H04W 4/04* (2009.01)

(56) References Cited

U.S. PATENT DOCUMENTS

| | | | | |
|---|---|---|---|---|
| 2009/0292465 | A1* | 11/2009 | Kaldewey | G01C 21/00 701/533 |
| 2009/0326893 | A1* | 12/2009 | Neely | G08G 5/0034 703/8 |
| 2010/0121567 | A1* | 5/2010 | Mendelson | G01C 21/206 701/467 |
| 2011/0153208 | A1* | 6/2011 | Kruglick | G01C 21/20 701/533 |
| 2012/0044265 | A1* | 2/2012 | Khorashadi | G01C 21/206 345/641 |
| 2012/0246039 | A1* | 9/2012 | Fain | G06Q 10/08 705/32 |
| 2012/0290636 | A1* | 11/2012 | Kadous | G01S 1/72 709/203 |
| 2013/0253818 | A1* | 9/2013 | Sanders | G01C 21/206 701/419 |
| 2013/0297198 | A1* | 11/2013 | Vande Velde | G01C 21/28 701/409 |
| 2013/0332273 | A1* | 12/2013 | Gu | G06Q 30/0205 705/14.53 |

FOREIGN PATENT DOCUMENTS

| | | | |
|---|---|---|---|
| WO | 2012009328 | A1 | 1/2012 |
| WO | 2012084003 | A1 | 6/2012 |
| WO | 2012106075 | A1 | 8/2012 |

OTHER PUBLICATIONS

International Search Report and Written Opinion for Application No. PCT/CN2012/080177 dated May 23, 2013.

Matti Raitoharju et al: "Using unlocated fingerprints in generation of WLAN maps for indoor positioning", Position Location and Navigation Symposium (PLANS), 2012 IEEE/ION, IEEE, Apr. 23, 2012, pp. 576-583, XP032200279.

Extended European Search Report for Application No. EP12883008 dated Sep. 1, 2015.

* cited by examiner

CROWD-SOURCING INDOOR LOCATIONS

CROSS REFERENCE TO RELATED APPLICATIONS

The present application is a national phase entry under 35 U.S.C. §371 of International Application No. PCT/CN2012/080177, filed Aug. 15, 2012, published in English. The entire disclosure of the above-identified application is incorporated by reference herein.

BACKGROUND

Current techniques to determine indoor locations of mobile devices are based on interior scans of wireless access points. The scans may be used to build a database that can model an indoor space by determining locations of the access points and their corresponding signal strengths at those locations. Typically, to create this type of database, an indoor location provider may conduct site surveys at selected locations. However, this may require surveying tens of thousands of buildings and floors to determine the location of the wireless access points. Moreover, the database can become stale and inaccurate overtime due to location changes in the access points after the surveys are complete.

SUMMARY

Aspects of this disclosure may be advantageous for providing a scalable method to conduct site surveys to construct wireless access point models of an indoor location. By crowd-sourcing wireless and INS signals from multiple client devices moving through the indoor location, an accurate and up to date model database of access points can be created and maintained.

One aspect of the present technology provides a method. The method includes identifying a map of an indoor space, receiving inertial navigation signals from a first set of mobile devices moving through the indoor space and calculating, using a processor, a number of user trajectories based on the received set of inertial navigation signals. In this regard, the map may be based on a plurality of constraints and the inertial navigation signals may represent a direction and speed of movement of the mobile devices. The method also includes identifying paths associated with the number of user trajectories, determining a score for each of the identified paths based on a similarity of a given path to the number of user trajectories, selecting at least one path from the identified paths that scores above a pre-determined threshold and generating, using the processor, map information based on at least one selected path that identifies walkable areas of the indoor space. Each path may include a number of turns traveled between a first position and a second position on the map.

In one aspect, the method may also include refining the identified paths based on a comparison of the wireless network access point identifiers associated with each path. In that regard, the refining may remove duplicate paths. In another aspect, the number of turns traveled along the identified paths may include a directional indicator and a distance between each turn. In yet another aspect, the inertial navigation signals may include one of: accelerometer data, gyroscope data, and compass data.

Another aspect of the present technology provides a system. The system includes a memory storing maps of indoor spaces, a receiver module to receive inertial navigation signals from a first set of mobile devices moving through the indoor space and a processor coupled to the memory. The processor is configured to identify a map of an indoor space stored in the memory and calculate a number of user trajectories based on the inertial navigation signals received at the receiver module. In this regard, the map may be based on a plurality of constraints and the inertial navigation signals may represent a direction and speed of movement of the mobile devices. The processor is also configured to identify paths associated with the number of user trajectories, determine a score for each of the identified paths based on a similarity of a given path to the number of user trajectories, select at least one path from the identified paths that score above a pre-determined threshold, and generate map information based on at least one selected path that identifies walkable areas of the indoor space. Each path may include a number of turns traveled between a first position and a second position on the map.

Yet another aspect of the present technology provides a tangible computer-readable storage medium. The storage medium includes instructions of a program when executed by a processor causes the processor to perform a method. The method includes identifying a map of an indoor space, receiving inertial navigation signals from a first set of mobile devices moving through the indoor space and calculating, using a processor, a number of user trajectories based on the received set of inertial navigation signals. In this regard, the map may be based on a plurality of constraints and the inertial navigation signals may represent a direction and speed of movement of the mobile devices. The method also includes identifying paths associated with the number of user trajectories, determining a score for each of the identified paths based on a similarity of a given path to the number of user trajectories, selecting at least one path from the identified paths that scores above a pre-determined threshold and generating, using the processor, map information based on at least one selected path that identifies walkable areas of the indoor space. Each path may include a number of turns traveled between a first position and a second position on the map.

DETAILED DESCRIPTION

Aspects, features and advantages of this disclosure will be appreciated when considered with reference to the following description of embodiments and accompanying figures. It should be noted that the same reference numbers in different drawings may identify the same or similar elements. Furthermore, the following description is not limiting; the scope of the present technology is defined by the appended claims and equivalents.

In this disclosure, techniques are provided for a scalable method and system of passively conducting a site survey of an indoor space using inertial navigation system (INS) signals from user devices. This technology may be used to determine areas of the indoor space that are most often traveled. According to aspects, by tracking INS signals (e.g., readings from accelerometers, gyroscopes, compass, pressure sensors, etc.) from a number of participating users holding client devices, trajectories of the users can be estimated as they move their client devices through an indoor space. The estimated trajectories can be scored against similar routes taken by other users. In this regard, routes with the highest scores may then be laid out over a map of the indoor space to identify landmarks where users may make a turn and distances between the turns. In one aspect, a wireless signal signature may also be collected to accurately identify geo-locations along the highest scoring routes.

Figure 1:
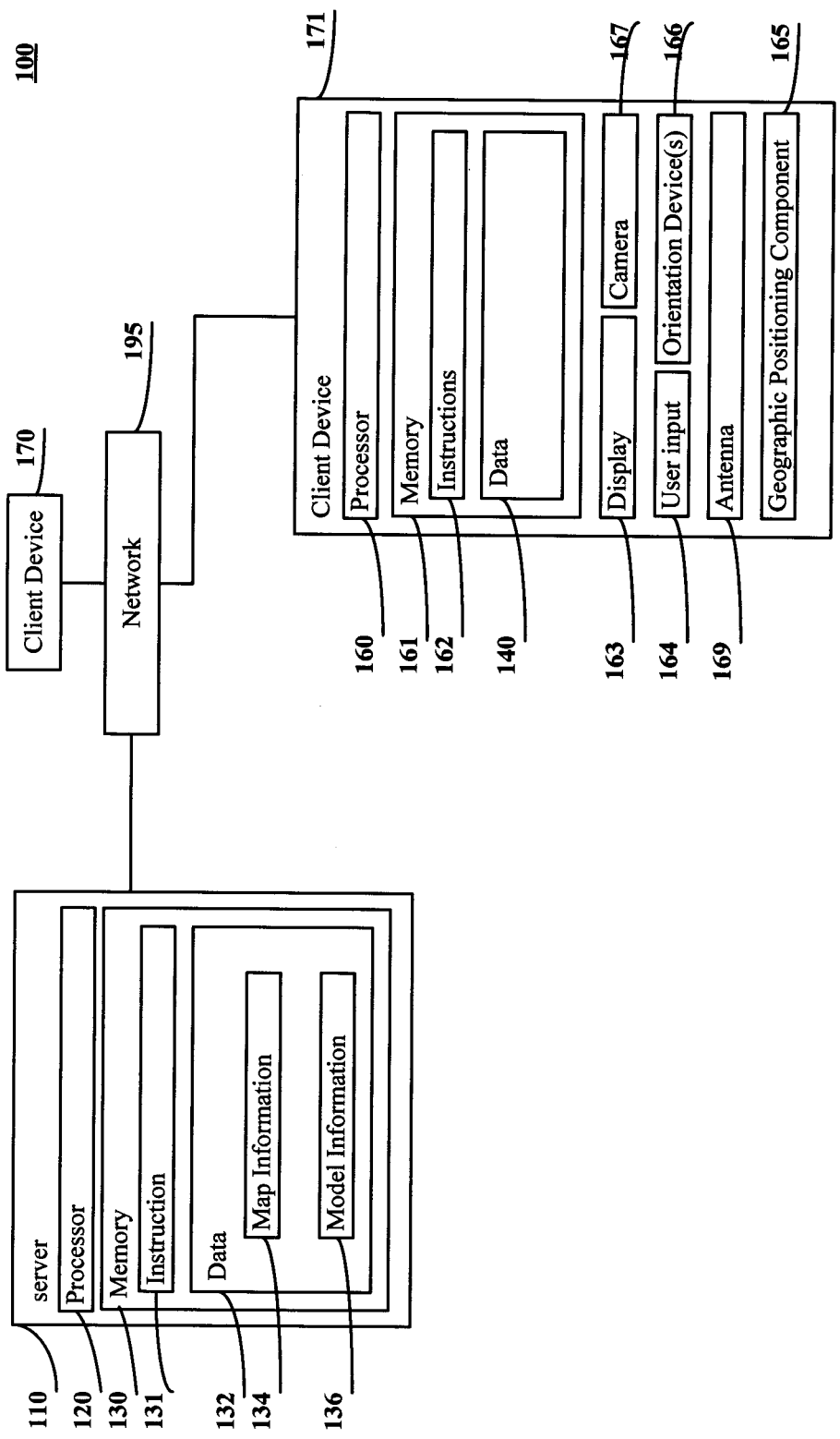
FIG. 1 is a functional diagram of a system in accordance with the disclosure.

FIG. 1 is a functional diagram of a system 100, which may include a server 110 coupled to a network 195. The system 100 may also include a number of client devices 170 and 171 capable of wireless communication with the server 110 over the network 195.

The server 110 may contain a processor 120, memory 130, and other components typically present in general purpose computers. The memory 130 of server 110 may store information accessible by the processor 120, including instructions 131 that can be executed by the processor 120. Memory may also include data 132 that can be retrieved, manipulated or stored by the processor 120. The memory 130 may be a type of non-transitory computer readable medium capable of storing information accessible by the processor 120, such as a hard-drive, memory card, ROM, RAM, DVD, CD-ROM, write-capable, and read-only memories. The processor 120 may be a well-known processor or other lesser-known types of processors. Alternatively, the processor 120 may be a dedicated controller such as an ASIC.

Although FIG. 1 functionally illustrates the processor 120 and memory 130 as being within the same block, it will be understood that the processor 120 and memory 130 may actually include multiple processors and memories that may or may not be stored within the same physical housing. For example, some of the instructions 131 and data 132 may be stored on a removable CD-ROM and others within a read-only computer chip. Some or all of the instructions 131 and data 132 may be stored in a location physically remote from, yet still accessible by, the processor 120. Similarly, the processor 120 may actually include a collection of processors, which may or may not operate in parallel.

The instructions 131 may be a set of instructions to be executed directly (e.g., machine code) or indirectly (e.g., scripts) by the processor 120. For example, the instructions 131 may be stored as computer code on the computer-readable medium. In that regard, the terms "instructions" and "programs" may be used interchangeably herein. The instructions 131 may be stored in object code format for direct processing by the processor 120, or in any other computer language including scripts or collections of independent source code modules that are interpreted on demand or compiled in advance. Functions, methods and routines of the instructions 131 are explained in more detail below.

The data 132 can be retrieved, stored or modified by processor 120 in accordance with the instructions 131. For instance, although the systems and methods are not limited by any particular data structure, the data 132 can be stored in computer registers, in a relational database as a table having a plurality of different fields and records, XML documents or flat files. The data 132 can also be formatted in any computer-readable format. The data 132 may include information sufficient to identify relevant data, such as numbers, descriptive text, proprietary codes, references to data stored in other areas of the same memory or different memories (including other network locations) or information that is used by a function to calculate the relevant data.

Data 132 of server 110 may include model information 136. For example, a model may include a set of locations associated with an indoor space. Each location of the set of locations may be associated with wireless network access point data describing the expected wireless network access point signals and corresponding signal strengths expected to be detected by a device scanning for such signals at different locations of the indoor space. The expected wireless network access point signals may be specific values or may be a range of values. It should be noted that a set of locations for an indoor space may also be associated with and/or determined based on various signals, such as radio frequency (RF) signals, light, sound image recognition signals, and other types of signals and/or environmental factors or any combination of these.

The server 120 may access map information 134. As described in more detail below, the map information 134 may include a series of floor plans representing an indoor space within a building. According to aspects, the map information 134 may be based upon a series of constraints (e.g., walls) representing locations where a user may not walk (or is not able to walk) within the building. These floor plan features may enable users to identify various areas of an indoor space. In some aspects, all or a portion of the map information 134 may be transmitted as needed to client devices 170 and 171 for storage there as well.

Each client device 170 and 171 can be configured similarly to the server 110, with a processor 160, memory 161 and instructions 162 as described above. Each client device 170 and 171 may be a personal computing device and have all of the components normally used in connection with a personal computer such as a central processing unit (CPU) 160, memory 161 (e.g., RAM and internal hard drives) storing data 168 and instructions 162, an electronic display 163 (e.g., a monitor having a screen, a touch-screen, a projector, a television, a computer printer or other device that is operable to display information), and end user input 164 (e.g., a mouse, keyboard, touch screen or microphone). The client device 171 may also include a camera 167, speakers, a network interface device, and all of the components used for connecting these elements to one another.

The client device 171 may include an antenna 169 which may be used to scan the wireless network spectrum and identify local wireless network signals. For example, the antenna may receive "beacon" messages which demodulates the information to identify wireless network access points. In one example, these beacon messages may be IEEE 802.11 management frames transmitted by access points to announce themselves to potential wireless network users. These frames may contain Service Set Identifiers ("SSID") information as well as physical layer parameters that assist devices in connecting to the wireless network. The beacon messages may also include additional network access information which also assists devices in accessing the network, including whether the access point is accepting new users, whether the data is encrypted, and which type of authentication is being used, for example, no authentication (open to all), password based, web-portable based, or Media Access Control ("MAC") address based. However, it will be understood that data collected in accordance with this disclosure may be limited to the information discussed above, for example MAC addresses, SSIDs or other identifiers and signal strengths, and need not contain additional information. For example, information contained in the network traffic or payload data, such as personal information, need not be collected, and in fact, may actually be removed in order to protect the privacy of the wireless network's users.

The client device 171 may include a geographic position component 165, to determine the geographic location of the client device 171. For example, client device 171 may include a GPS receiver to determine the device's latitude, longitude and altitude position. Thus, as the client device 171 changes location, for example by being physically moved, the GPS receiver may determine a new current location. The component 165 may also include software for determining the position of the client device 171 based on other signals received at the client device 171, such as signals received from one or more wireless network access points.

To determine the direction in which the client device 171 is oriented, the device 171 may include one or more orientation devices 166 such as an accelerometer, gyroscope, compass, or any combination of these. For example, an accelerometer may be used to detect the effect of gravity on the client device 171 measured, for example, in meters per second. By way of example only, the client device 171 may use input from the accelerometer to determine the client device's pitch, yaw or roll (or changes thereto) relative to the direction of gravity or a plane perpendicular thereto. In that regard, it will be understood that a client device's provision of orientation data as set forth herein may be provided automatically to the client device 171.

The orientation data received from the orientation device 166 may be used in various ways. For example, an accelerometer or gyroscope may be used as a pedometer by running an average of the acceleration values to identify which direction is down (e.g., towards the Earth). A simple step detector may be constructed by deciding a step has been taken each time the component in the down direction is greater than an empirically determined threshold. Using an approximate stride length or speed of a person may approximate the distance of each step.

Figure 2:
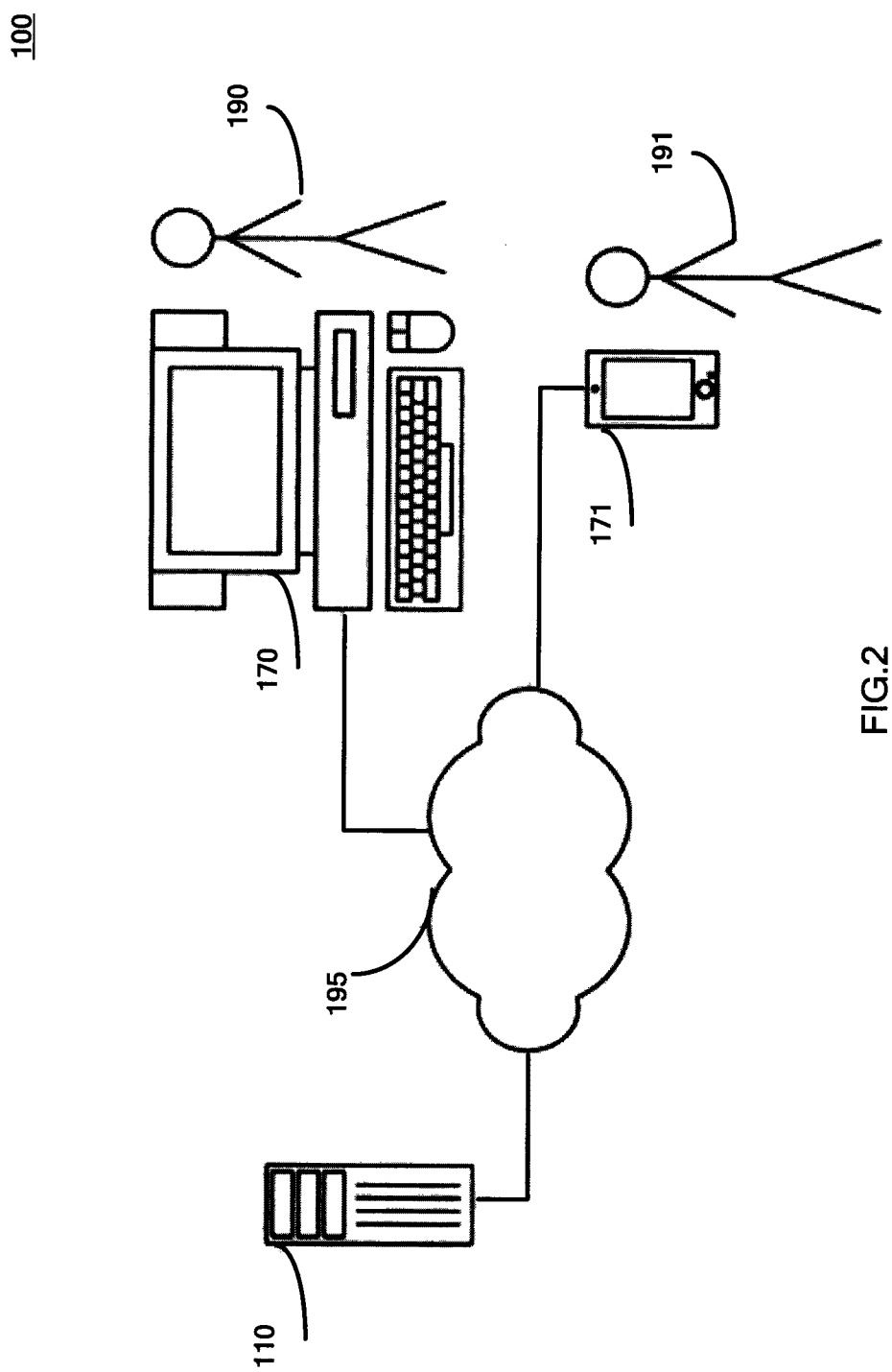
FIG. 2 is a pictorial diagram of a system in accordance with the disclosure.

FIG. 2 is a pictorial diagram of a system 100. According to some aspects, the system 100 may include client devices 170 and 171 that are capable of wireless communication over a network 195 to a server 110. By way of example only, client device 170 may be a portable personal computer such as a wireless-enabled PDA, a tablet PC, or a net book capable of obtaining information via the Internet. A user 190 may input information using a small keyboard, a keypad, or a touch screen. Alternatively, client device 171 may also include a mobile device such as a mobile phone intended for use by a person 191.

The server 110 may be at one node of network 195 and capable of directly and indirectly communicating with other nodes of the network 195. For example, the server 110 may include a web server that may be capable of communicating with client devices 170 and 171 via network 195 such that it uses the network 195 to transmit and display information to a user on a display of the client device 171. Server 110 may also include a plurality of computers, e.g., a load balanced server farm, that exchange information with different nodes of a network for the purpose of receiving, processing and transmitting data to client devices 170 and 171. In this instance, the client devices 170 and 171 will typically still be at different nodes of the network 195 than the computers comprising server 110.

The network 195, and intervening nodes, may include various configurations and protocols including the Internet, World Wide Web, intranets, virtual private networks, wide area networks, local networks, private networks using communication protocols proprietary to one or more companies, Ethernet, WiFi (e.g., 802.11, 802.11b, g, n, or other such standards), HTTP, and various combinations of the foregoing. Such communication may be facilitated by any device capable of transmitting data to and from other computers, such as modems (e.g., dial-up, cable or fiber optic) and wireless interfaces.

Although certain advantages are obtained when information is transmitted or received as noted above, other aspects of the system and method are not limited to a particular manner of transmission of information. For example, in some aspects, information may be sent via a medium such as a disk, tape or CD ROM. Yet further, although some functions are indicated as taking place on a single server having a single processor, various aspects of the system and method may be implemented by a plurality of servers, for example, communicating information over network 195. In addition to the components described above and illustrated in the figures, various operations will now be described.

Figure 3:
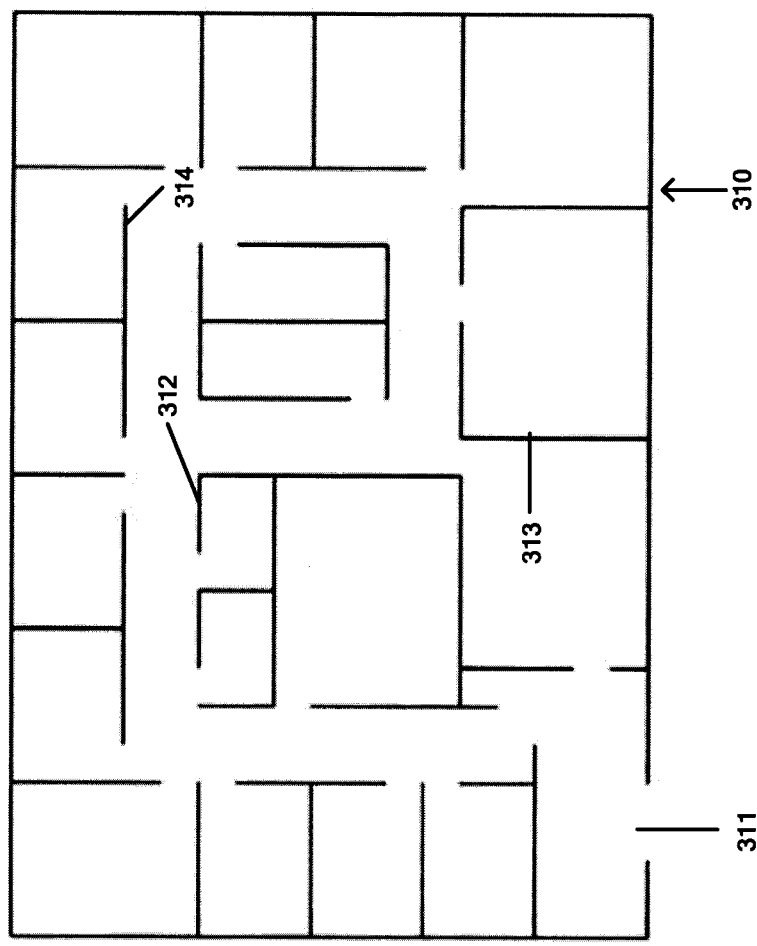
FIG. 3 is an example floor plan of an indoor space in accordance with aspects of the disclosure.

FIG. 3 is an example floor plan 310 of an indoor space 300. As described above, a client device may retrieve map information that may represent, for example, the floor plan 310 of a space in a building. As shown in FIG. 3, the floor plan 310 of an indoor space 300 may include an entrance 311 and several constraints. For example, walls 312-314 may define various rooms, hallways, etc., as well as openings (such as doorways) of the floor plan 310. The floor plan 310 features may enable users to identify various areas of the indoor space 300.

A user may sign up or opt to participate in order to send or receive information (e.g., INS signals and map information) as they walk their client device through the indoor space 310. Users may be required to take an affirmative step in order to select or "opt-in" to participate. For example, users may be required to sign in to a registration service before providing signal information. Users may be paid for data provided and may also be provided with an explanation of how and why their data is being used. Similarly, users may be provided with the opportunity to cease participation temporarily or permanently at any time. Preferably, privacy protections are provided for any user data transmitted by the client device, including, for example, anonymization of personally identifiable information, aggregation of data, filtering of sensitive information, encryption, hashing or filtering of sensitive information to remove personal attributes, time limitations on storage of information, or limitations on data use or sharing. Moreover, the data may be anonymized and aggregated such that individual user data is not revealed.

After opting to participate, the user may identify a floor plan 310 using a client device such as client device 171 described with respects to FIG. 1. According to aspects, the users may actively input the indoor location to the client device, for example, by selecting a point on a display or entering an address or other location identifying information. In one aspect, the user may scan a bar code or capture an image of some other features associated with a known location (for example, a picture of a door, sign, monument, etc.).

The barcode or geolocated feature may cause the client device to identify a location to be used as a beginning location. For example, the geolocated feature or barcode may include information for identifying a location (e.g., by requesting information from a server). In another aspect, the client device may identify a starting position based on a coarse wireless network access point proximity-based localization algorithm, for example, that makes use of a stored set of wireless network access point locations such as a type used in a wireless access point model built of the same area.

In another aspect, to identify an actual beginning location 311 on the floor plan 310, a server may use information such as a point on the floor plan 310, an address, GPS coordinates, code, location identifiers, etc. For example, as a user holds a client device equipped with features such as a GPS and an accelerometer, the client device may detect when the user is moving indoors. In this regard, when an accelerometer is making measurements above a certain threshold, it may be determined that the client device is moving, or the user is walking, running, etc. While a GPS signal is being received, the client device (and the user) is recognized as being outside. When the GPS signals are suddenly lost, it may be determined that the user has entered a structure, for example, a building. Using INS signals from the client device, the user's trajectory may be then tracked.

Figure 4:
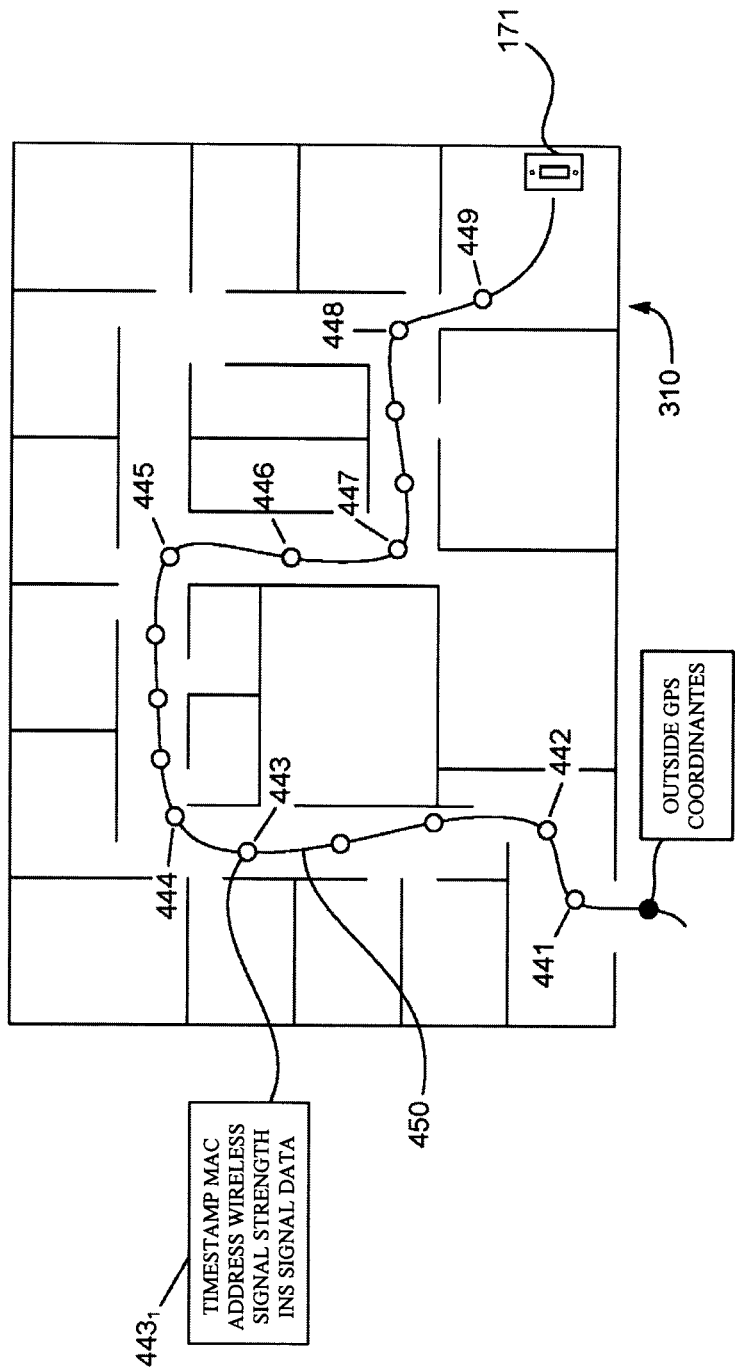
FIG. 4 is an example of signal logs collected from a client device in accordance with aspects of the disclosure.

FIG. 4 is an example of signal logs 441-449 collected from a client device 171. As illustrated in FIG. 4, while a user is moving through a floor plan 310 of an indoor space 300, the user's client device may record signal logs 441-449. In some aspects, the client device may calculate signal logs (e.g., a time-indexed log of signals) for every unit of time the client device is moving. For example, the signal log may be calculated periodically, such as every 0.1 seconds. In order to reduce the amount of data calculated, for example, to save memory processing, and, in some aspects, transmission resources this period may be re-configured. In one aspect, the period may be doubled to 0.2 seconds, thus half as many signal log entries will be calculated.

As shown in FIG. 4, the signal logs 441-449 may represent an estimated path 450 taken by the user holding the client 171. In this regard, the path may include a plurality of signal log entries at different locations within the floor plan 310. Log entry 443$_1$ represents one such entry including data such as a timestamp, wireless signal strength and INS signal data. The information collected by the client device may be limited to the information discussed above (e.g. wireless access point identifiers such as SSIDs or MAC addresses and respective signal strengths, accelerometer, orientation and compass measurements, as well as other measurements) and need not contain additional information. For example, information contained in network traffic, such as personal information, need not be collected and in fact, may be removed in order to protect the privacy of the wireless network users.

According to some aspects, the user may reach a destination within the indoor space 310 and stop moving. The client device 171 may detect this based on a particular pattern of INS signal data (e.g., accelerometer readings). For example, the client device 171 may determine that it has stopped moving based on a lack of accelerometer information for some pre-defined period, such as one minute, or based on whether the accelerometer readings are below some threshold value. For example, as shown in FIG. 4, client device 171 has reached destination 449 within the floor plan 310. At destination 449, the accelerometer reading may indicate that the user has stopped moving.

In response to reaching a destination, the client device may record the destination and order information as a wireless coordinate set, for example, a timestamp, wireless signal strength and INS data signals from the client device 171. Once the INS data indicates that the client device is moving again (e.g., the accelerometer readings are above a certain threshold), the client device may continue to collect and record signal logs as described above. In one aspect, the client device may use the signal logs collected by the client device 171 to compute a projected trajectory of the user.

Figure 5:
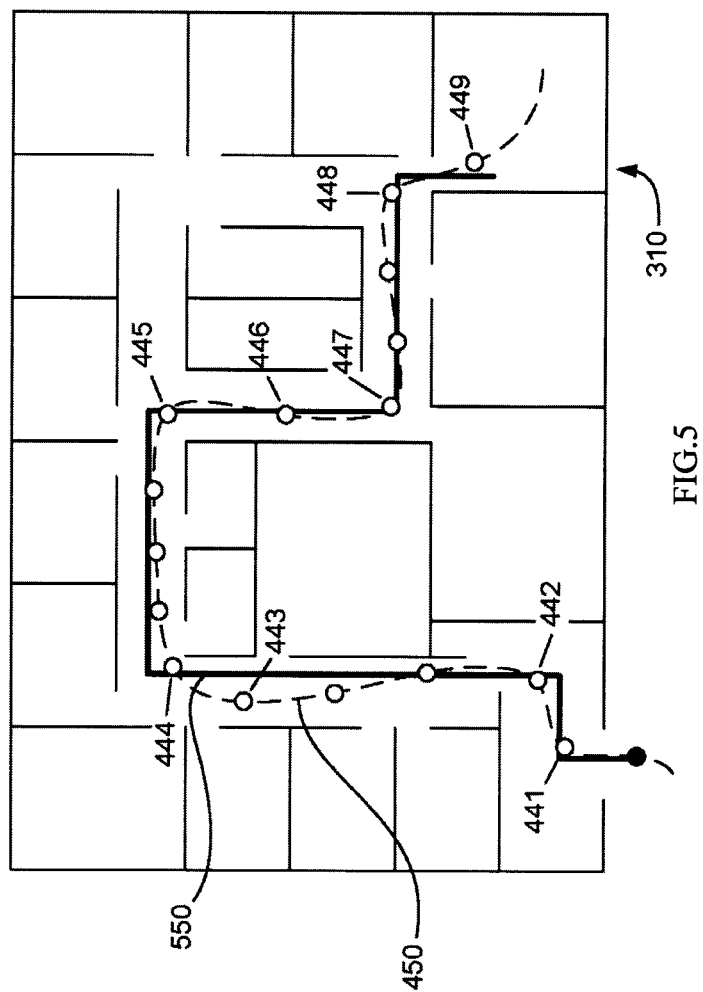
FIG. 5 is an example of a computed trajectory in accordance with aspects of the disclosure.

FIG. 5 is an example of a computed trajectory 550. According to aspects, the trajectory 550 of a user moving through an indoor space 300 can be computed based on INS signals from the user's client device. For example, the trajectory 550 may be calculated by using a dead-reckoning method utilizing the client device as a pedometer. As shown in FIG. 5, dashed line 450 represents an estimated path of a user that includes a number of INS signal logs 441-449 recorded from the user's client device. Solid line 550 represents the user's computed trajectory based on the recorded signal logs 441-449. In one aspect, using accelerometer readings from the recorded signal logs, approximate measurements can be made of how fast the user holding the client device may be moving. In some aspects, compass measurements from the recorded signal logs may be used to determine directional movements of the user. It will be understood that while the device is indoors some INS signals (e.g., compass readings) may be less reliable due to metal obstruction and electronic devices. Moreover, some individuals may have shorter steps while others may be longer. Thus, the INS signal data may identify only a rough shape of the trajectory 550 the user has taken.

Figure 6:
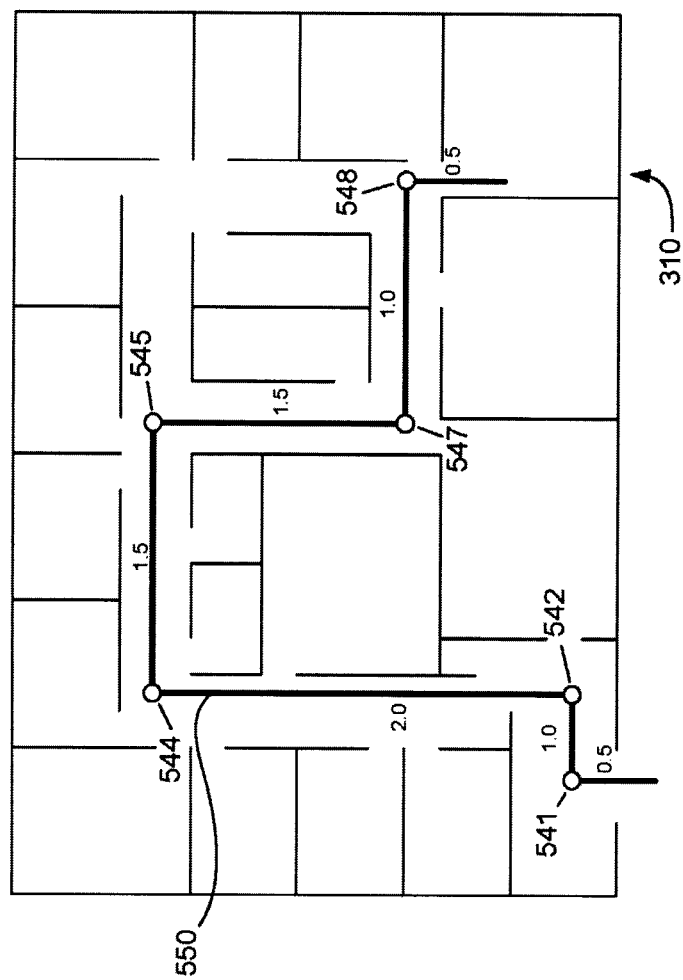
FIG. 6 is an example of the trajectory of FIG. 5 simplified in accordance with an aspect of the disclosure.

FIG. 6 is an example of the trajectory 550 of FIG. 5 simplified. As shown in FIG. 6, the trajectory 550 has been simplified to a number of turns and a distance between each turn. According to aspects, in order to simplify the trajectory 550 to improve its clarity, an algorithm may be employed for reducing the number of INS signals logs used to approximate movements of the user. For example, by running a type of smoothing algorithm (e.g., Ramer-Douglas-Peucker) against collected INS signal logs used to compute trajectory 550, the trajectory 550 may be reduced to a list of log entries including turns the user made represented by points 541, 542, 544, 545, 547 and 548, and a relative distance between each turn. The relative distance can be determined by estimating (e.g., using dead-reckoning) a relative position of each turn, for example, based on the speed and heading of the user over period of time.

As previously discussed, trajectory 550 may be computed from INS signals (e.g., accelerometer, compass and gyroscope readings) collected from a client device. In one aspect, the trajectory can be represented by a series of 2-D points in a vector from 0 to N steps. For example, [(x0, y0), (x1, y1), . . . , (xn, yn)], where x represents a direction and y represents an angle of a turn. In this example, if the directional value of x is 1, it may mean that a user took a left turn. Otherwise, a value of −1 may mean that a right turn was taken. For example, the simplified trajectory 550 may be represented by a 2-D point vector such as the following, [(−1, 90), (1, 90), (−1, 90), (−1, 90), (1, 90), (−1, 90)]. Along vertices of the trajectory 550, distances between each turn can also be computed. For example, this may be represented by a distance vector of integers (e.g., [0.5, 1.0, 2.0, 1.5, 1.5, 0.5, 0.5]) with each integer representing a distance (e.g., in inches, feet, meters, yards, etc.) traveled by the user. While the trajectory 550 only includes a few points 541-548, it will be appreciated that the trajectory 550 can consist of hundreds of 2-D points that are computed from tens of thousands of signal log readings.

According to aspects, after the trajectory 550 has been computed it may be recorded by a client device. Alternatively or additionally, crowd-sourced trajectories may be transmitted to a server for further processing. For example, a server may be able to aggregate a number of computed user trajectories to determine a high quality number of routes within the indoor space 300. In one aspect, by aggregating enough routes an entire layout of the indoor space 300 can be determined.

Figure 7:
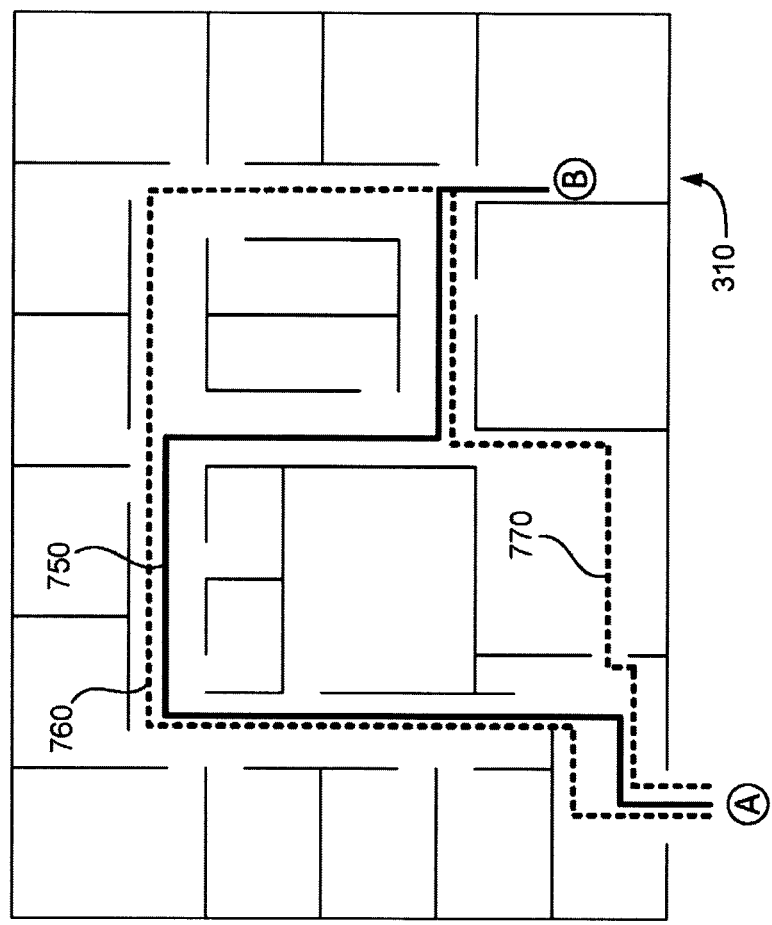
FIG. 7 is an example of multiple routes through an indoor space in accordance with an aspect of the disclosure.

FIG. 7 is an example of multiple routes 750, 760, 770 through an indoor space 300. In some aspects, there may be multiple routes that a user may take to a particular destination. For example, routes 750, 760 and 770 represent some of a plurality of calculated user trajectories between locations A and B, both of which locations may be known locations on a floor map 310. Location A may be an entrance to the floor map 310 and location B a particular conference room within the floor map 310. There may be a number of "good" candidate routes possible from A to B, for example, routes which actually define locations where users are likely to walk. Other "outlier" routes may represent routes from A to B not taken often, for example, route 770 in FIG. 7 may represent a route calculated from the trajectory of a security guard through a security door. In order to identify the "good" routes, similar user trajectories which likely represent the same possible route from A to B may be scored. The scores may be used to identify the "good" routes for a group of similar user trajectories.

According to aspects, an initial "good" candidate route that traverses any two landmarks on the floor plan 310 may be selected (e.g., a room, concession stand, cash register, or other frequented user destinations). For example, route 550 may be selected as the initial "good" candidate route between positions A and B based on a number of turns in the route below a threshold value. As previously discussed, route 550 may represent a calculated user trajectory between positions A and B. For each initial candidate route, similarity metrics are produced and an overall match score to other user trajectories between the two landmarks can be determined based on the similarity metrics.

The similarity metrics define a subset of components that may be used for comparing the candidate routes to the user trajectories. For example, there may be three components to the similarity metrics: a distance similarity metric (P), a number-of-turns similarity metric (T), and a turn-angle similarity metric (D). The distance similarity metric (P) may be computed by comparing one candidate route to the user trajectories. For example, a distance vector of the candidate route may be compared to a distance vector of user trajectories using a correlation coefficient such as Pearson's coefficient. The correlation coefficients may measure relationship strengths between the candidate route and the user trajectories. The number-of-turn similarity metric (T) may be computed by determining the number of turns in a given user trajectory and subtracting the number of turns derived from the candidate route. The turn-angle similarity metric (D) may be represented by the following equation:

$$D = \left(\sum_{i=1}^{N} \text{abs}(turnOfTrajecory[i] - turnOfCandidateRoute[i])\right) \bigg/ (180 * N)$$

In the equation above, N represents a minimum number of turns matching between a user trajectory and a candidate route, turnOfTrajectory[i] represents the turn angle of the ith angle in the trajectory and turnOfCandidateRoute[i] represents the ith turn angle in the candidate route.

Finally, a combination of D, T and P may be used to determine a final similarity score. For example, the combination may be represented by the following equation:

Final Similarity Score=$D*P+T^2$

Candidate routes with the highest sores when compared to the user trajectories may be selected as the best route for the group of user trajectories. For example, the top candidates above a pre-determined threshold value may be selected. Alternately, a top number of candidates can be selected (e.g., the top three).

Figure 8:
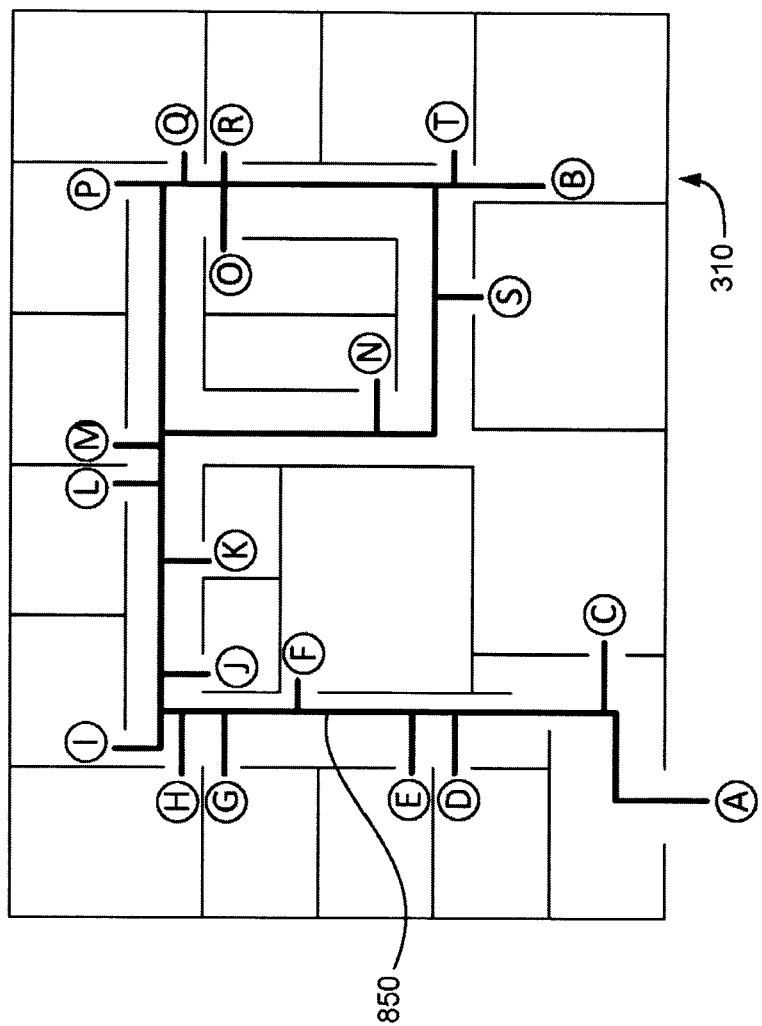
FIG. 8 is an example of a computed layout of areas traveled in an indoor space in accordance with aspects of the disclosure.

FIG. 8 is an example of a computed layout of areas traveled in an indoor space 300. By aggregating data from the top "good" candidate routes (e.g., computed user trajectories), it may be possible to generate layout representations of buildings, rooms, etc. For example, as shown in FIG. 8, landmarks A to T may represent known landmarks in the indoor space. For example, the landmarks can be an office, conference room, bathroom or a number of other frequently visited landmarks in a typical indoor space. Top routes between any given two landmarks from A to T may be connected and drawn on a floor map 310 to create a skeleton 850 of walkable areas around constraints (e.g., walls) in the indoor space 300, for example, walkable routes between any two given known landmarks (A,B), (B,C), (C,T), . . . , etc.

In some aspects, further refinement may be employed to increase accuracy of the defined walkable areas. For example, wireless access point data collected along the best walkable routes can be examined to determine if the same points are on two different routes. Based on the comparison, duplicate routes may be discarded. With a sufficiently larger amount of refined routes, containment relationships between buildings and rooms may be derived. Moreover, indoor constraints not previously mapped can be determined, for example, areas where users regularly walk around can be unmapped walls, display stands, rooms, etc.

Figure 9:
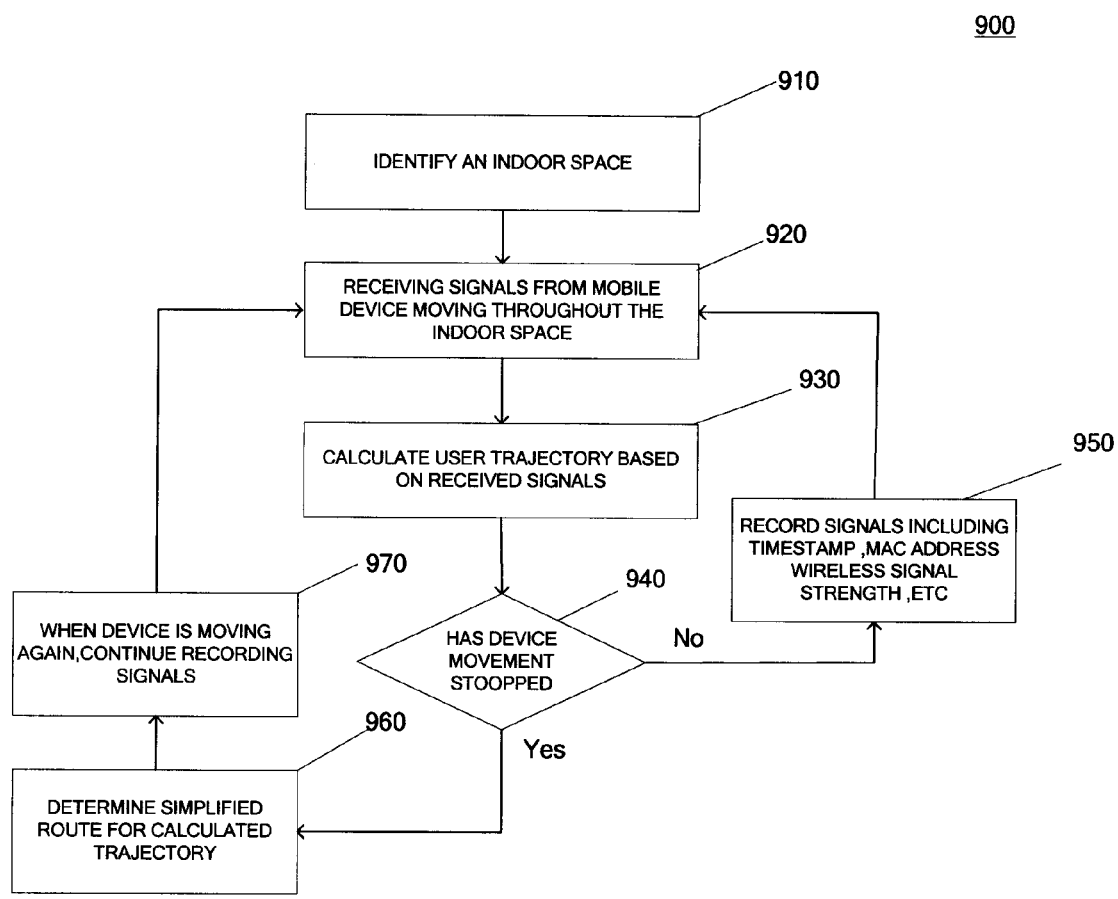
FIG. 9 is a method of crowd-sourcing signal logs in accordance with an aspect of the disclosure.

FIG. 9 is a method 900 of crowd-sourcing signal logs. Crowd-sourcing may involve collecting signal log information (e.g., a time-indexed log of INS signals and wireless signal strengths) from a number of user client devices as users walk through an indoor space. For example, a server may receive a number of signal logs from a number of client devices. As previously discussed, this collection of information may be conducted after the users have actively provided their consent to participate.

At stage 910, an indoor space may be identified. According to aspects, a map of an indoor space may be accessed for tracking user movements. For example, users may actively input an indoor location to the client device, for example, by selecting a point on a display or entering an address or other location identifying information. In one aspect, the user may scan a bar code or capture an image of some other feature of the indoor space associated with a known location (e.g., a picture of a door, sign, monument, or some other feature associated with a location in the indoor space).

In some aspects, it can be detected at this stage when the users have moved indoors. For example, a user holding a client device equipped with global positioning features, such as a GPS, may receive GPS signals while outside. When the GPS signals are suddenly lost, it may be determined that the user has entered a structure, for example, a building.

At stage 920, signals may be received from mobile devices as they move through the indoor space. For example, the received signals may identify particular movements (e.g., pace and turns). The mobile device may be equipped with orientation devices (e.g., accelerometers, gyroscopes, compass, pressure sensors, etc.) to produce INS signals that can be tracked and stored. In some aspects, signals from the client device may also include information to identify the client device and its current location (e.g. wireless access point identifiers such as SSIDs or MAC addresses and respective signal strengths).

At stage 930, trajectories of the mobile devices may be calculated. According to aspects, the trajectory of the users can be computed based on the INS signals received from the user's client device. For example, the trajectories may be computed using a dead-reckoning method that utilizes the client devices as a pedometer to estimate speed and direction. For example, accelerometer readings from a given client device may approximate measurements of how fast the user may be moving and a rough shape of the user's trajectory. In some aspects, compass measurements may also be used to determine directional movements of the user.

At stage 940, it may be determined whether the device has stopped moving. For example, this determination may be made based on a lack of accelerometer information from the user client device for some predefined period, such as 1 minute, or based on whether the accelerometer readings are below some threshold value. If it is determined that the device has stopped moving, method 900 may proceed to stage 960. Otherwise, the method 900 may proceed to stage 950.

At stage 950, signal logs may be recorded. According to aspects, the signal logs may be recorded on the client device, a backend server or some combination thereof. The signal logs may include a timestamp, accelerometer, orientation and compass measurements, wireless strengths, as well as other measurements such as Bluetooth, etc. For every unit of time along a trajectory, a signal log may be recorded (e.g., a time-indexed log of signals). For example, the signal log may be recorded periodically, such as every 0.1 seconds. While the device is moving, method 900 may repeat stage 920 in order to receive further signals from the client device for recording.

Alternatively, signal logs may be uploaded as they are recorded to allow for more complex processing such as with a backend server. In one aspect, signal logs may be uploaded only when requested by the user or when the client device is connected to a particular mobile or wireless network or where the client device has access to a network which meets some minimum bandwidth requirement.

At stage 960, simplified routes may be determined from the calculated trajectories. As the users move through the indoor space, several trajectories may be calculated using a number of signal logs. In order to process the trajectories to create simplified routes, a smoothing algorithm (e.g., Ramer-Douglas-Peucker) may be employed for reducing the number of signal logs used to approximate the trajectories. The simplified routes may include a minimum amount of information needed to identify the routes. For example, the simplified routes may include a start and ending position, a list of turns, and a relative distance between the turns. In this example, the list of turns may include a directional indicator and an angle of each turn.

At stage 970, when it is detected that the device is moving again (e.g., accelerometer readings are above some threshold value) method 900 may continue to recording signal logs as described above. For example, method 900 may repeat stage 920 in order to receive further client device signal data and calculate user trajectories based on the received data. According to aspects, by aggregating the signal data collected by employing method 900, it may be possible to generate a model representation of the areas traveled in an indoor space.

Figure 10:
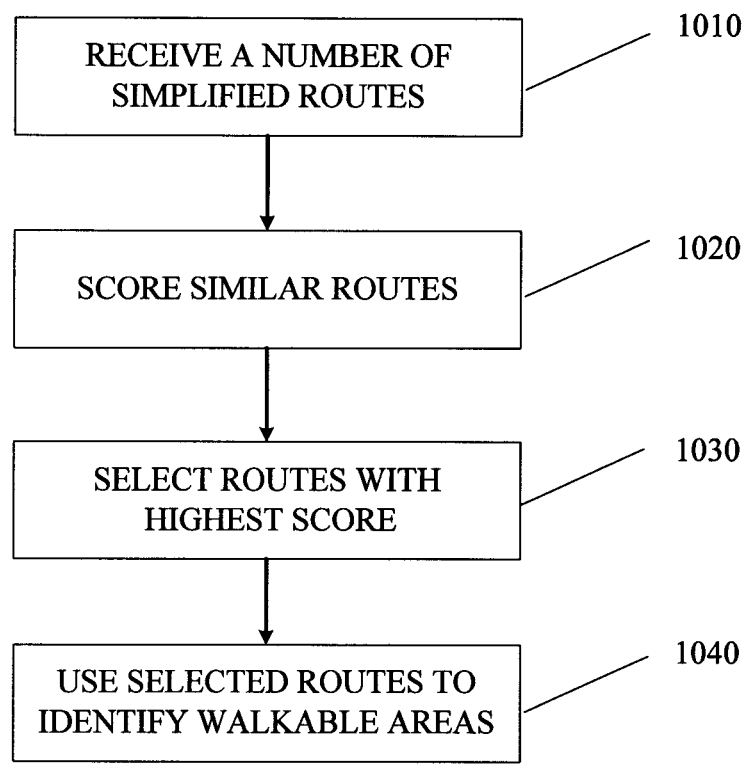
FIG. 10 is method of conducting a survey of areas most often traveled in an indoor space in accordance with an aspect of the disclosure.

FIG. 10 is method 1000 of conducting a site survey of areas most often traveled in an indoor space. According to aspects, crowd-scoured signal data (e.g., signals received from a number of client devices that are moving throughout an indoor space) may be used to create simplified routes that to create a skeleton of walkable areas between known landmarks in the indoor space and a distance between each landmark.

At stage 1010, a number of routes for an indoor space may be received. For example, a server may receive routes and associated user trajectories from a number of client devices. The client devices may be used to track and calculate user trajectories as the users move the devices through the indoor space. Based on the user trajectories a number of common routes may be determined, e.g., routes with a similar start and end point. According to aspects, the client devices may calculate a route based on signal log data (e.g., timestamps, wireless access points and signal strengths, accelerometer measurements, etc.), an entrance coordinate, and an exit coordinate.

At stage 1020, routes may be scored. For example, the routes received in stage 1010 which likely represent the same possible routes are scored to identify the best route for a group of similar user trajectories. In some aspects, the scoring may be based on a combination of similarity metrics that are produced to compare the best routes to the user trajectories. Based on the comparison, routes that are used more often may score higher because they may be routes taken more often by users. The similarity metrics define a sub set of components that may be used for comparing the routes to the user trajectories. For example, there may be three components to the similarity metrics: a distance similarity metric, a number-of-turns similarity metric, and a turns-angle similarity metric. A combination of the three similarity metrics may be used to determine a final similarity score.

At stage 1030, routes with a highest score may be selected. Routes from stage 1020 with the highest sores may be selected as the best route for a group of user trajectories. For example, the top candidates above a pre-determined threshold value may be selected. Alternately, a top number of routes can be selected (e.g., the top three).

At stage 1040, the selected routes may be used to identify areas most often travel in an indoor space. For example, by aggregating data from the highest scoring routes at stage 1030, it may be possible to generate representations of buildings, rooms, etc. According to aspects, the routes may represent a route that users are most likely to take between two known landmarks (e.g., rooms). In one aspect, once a set of routes have been selected for the indoor space, the wireless access point collected along with the routes may be examined. For example, a common start and ending point may be identified for a group of selected routes. Taking the wireless access point into account over parts of the route, a determination may be made as to which routes or portions of the routes are in fact at the same location. For example, the same wireless access point may be observed along two separate routes between the same locations at coordinates (x1,y1) on a first route and (x2,y2) on a second route. In one aspect, these coordinate locations may be the same location or very similar. This information may be used to generate the most plausible set of routes given the observed measurements. The set of routes may be then grouped together to identify one or more paths between the common start and ending points within the indoor space.

The above-described aspects of the disclosure may be advantageous for providing a scalable method to conduct site surveys to construct a wireless access point model of an indoor location. By crowd-sourcing wireless and INS signals from multiple client devices moving through the indoor location, an accurate and up to date model database of access point can be created and maintained. For the purposes of simplicity, the examples herein are directed to a single indoor floor plan. However, it will be understood that the systems and methods described herein may be utilized in conjunction with multi-story buildings that include a number of indoor floor plans. For example, wireless network access points on different floors may be used to determine on which floor a user is located.

Although the present technology has been described with reference to particular examples, it should be understood that these examples are merely illustrative of the principles and applications of the present technology. For example, it should be understood that the described systems and methods can be performed in part or in their entirety on a mobile client device, such as a mobile phone, on a remote computing device, or on some combination thereof. Additionally, it should be understood that numerous other modifications could be made to the illustrative examples. However, these and other arrangements may be devised without departing from the spirit and scope of the present technology as defined by the appended claims.

What is claimed is:

1. A method, comprising:
    identifying a map of an indoor space, the map being based on a plurality of constraints;
    receiving inertial navigation signals from a first set of mobile devices moving through the indoor space, where the inertial navigation signals represent a direction and speed of movement of the mobile devices;
    calculating, using one or more processors, for each given mobile device of the first set of mobile devices a user trajectory based on the set of inertial navigation signals received from the given mobile device in order to provide a set of user trajectories for the mobile devices of the first set of mobile devices;
    identifying paths associated with the number of user trajectories by applying a smoothing algorithm to each user trajectory of the set of user trajectories, wherein each identified path comprises a set of turns traveled between a first position and a second position on the map;
    selecting a candidate path of the identified paths based on a number of turns in the set of turns in the candidate path;
    determining a score for each given path of the identified paths based on a similarity of the given path to the candidate path;
    selecting at least one path from the identified paths that scores above a pre-determined threshold; and
    generating, using the one or more processors, map information based on the at least one selected path that identifies walkable areas of the indoor space around constraints of the plurality of constraints of the map.

2. The method of claim 1, further comprising:
    receiving, from the first set of mobile devices, wireless network access point identifiers and associated signal strengths collected with the received inertial navigation signals, and
    wherein the generated map information comprises the received wireless network access point identifiers and associated signal strengths for the at least one selected path.

3. The method of claim 2, further comprising refining the identified paths based on a comparison of the received wireless network access point identifiers collected with the received inertial navigation signals used to generate the user trajectory that was used to generate each path, wherein the refining removes duplicate paths.

4. The method of claim 1, wherein the set of turns for a given one of the identified paths includes a directional indicator and a distance between each turn of the set of turns for the given one of the identified paths.

5. The method of claim 1, wherein the inertial navigation signals comprises one of: accelerometer data, gyroscope data, and compass data.

6. The method of claim 1, wherein each given path of the identified paths includes a distance between each turn of the set of turns of the given path.

7. The method of claim 1, wherein determining the score for each of the identified paths includes using a similarity metric including a distance similarity metric, a number-of-turns similarity metric, and a turn-angle similarity metric.

8. A system, comprising:
    a memory storing maps of indoor spaces;
    a receiver module to receive inertial navigation signals from a first set of mobile devices moving through the indoor space, where the inertial navigation signals represent a direction and speed of movement of the mobile devices; and
    one or more processors coupled to the memory, the one or more processors being configured to:
    identify a map of an indoor space stored in the memory, the map being based on a plurality of constraints;
    calculate for each given mobile device of the first set of mobile devices a user trajectory based on the inertial navigation signals received at the receiver module from the given mobile device;
    identify paths associated with the number of user trajectories by applying a smoothing algorithm to each trajectory of the set of user trajectories, wherein each identified path comprises a set of turns traveled between a first position and a second position on the map;
    selecting a candidate path of the identified paths based on a number of turns in the set of turns in the candidate path;
    determine a score for each given path of the identified paths based on a similarity of the given path to the candidate path;
    select at least one path from the identified paths that score above a pre-determined threshold; and
    generate map information based on the at least one selected path that identifies walkable areas of the indoor space around constraints of the plurality of constraints of the map.

9. The system of claim 8, wherein the one or more processors are further configured to receive, from the first set of mobile devices, wireless network access point identifiers and associated signal strengths collected with the received inertial navigation signals, and the generated map information comprises the received wireless network access point identifiers and associated signal strengths for the at least one selected path.

10. The system of claim 8, wherein the number of turns traveled along the identified paths comprises a directional indicator and a distance between each turn.

11. The system of claim 8, wherein the set of inertial navigation signals comprises one of: accelerometer data, gyroscope data, and compass data.

12. The system of claim 8, wherein each given path of the identified paths includes a distance between each turn of the set of turns of the given path.

13. The system of claim 8, wherein the one or more processors are further configured to determine the score for each of the identified paths using a similarity metric including a distance similarity metric, a number-of-turns similarity metric, and a turn-angle similarity metric.

14. A non-transitory, tangible computer-readable storage medium comprising instructions of a program, when executed by one or more processors, cause the one or more processors to perform a method, the method comprising:
   identifying a map of an indoor space, the map being based on a plurality of constraints;
   receiving inertial navigation signals from a first set of mobile devices moving through the indoor space, where the inertial navigation signals represent a direction and speed of movement of the mobile devices;
   calculating for each mobile device of the first set of mobile devices a user trajectory based on the set of inertial navigation signals received from the given mobile device in order to provide a set of user trajectories for the mobile devices of the first set of mobile devices;
   identifying paths associated the number of user trajectories by applying a smoothing algorithm to each trajectory of the set of user trajectories, wherein each identified path comprises a set of turns traveled between a first position and a second position on the map;
   selecting a candidate path of the identified paths based on a number of turns in the set of turns of the candidate path;
   determining a score for each given path of the identified paths based on a similarity of the given path to the candidate path;
   selecting at least one path from the identified paths that score above a pre-determined threshold; and
   generating map information based on the at least one of the selected set of paths that identifies walkable areas of the indoor space around constraints of the plurality of constraints of the map.

15. The non-transitory, tangible computer-readable storage medium 14, wherein the method further comprises receiving, from the first set of mobile devices, wireless network access point identifiers and associated signal strengths collected with the received inertial navigation signals, and the generated map information comprises wireless network access point identifiers and associated signal strengths collected along the identified paths.

16. The non-transitory, tangible computer-readable storage medium 15, wherein the method further comprising refining the identified paths based on a comparison of the received wireless network access point identifiers collected with the received inertial navigation signals used to generate the user trajectory that was used to generate each path, wherein the refining removes duplicate paths.

17. The non-transitory, tangible computer-readable storage medium 14, wherein the set of turns for a given one of the identified paths includes a directional indicator and a distance between each turn of the set of turns for the given one of the identified paths.

18. The non-transitory, tangible computer-readable storage medium 14, wherein the inertial navigation signals comprises one of: accelerometer data, gyroscope data, and compass data.

19. The non-transitory, tangible computer-readable storage medium 14, wherein each given path of the identified paths further includes a distance between each turn of the set of turns of the given path.

20. The non-transitory, tangible computer-readable storage medium of claim 14, wherein determining the score for each of the identified paths includes using a similarity metric including a distance similarity metric, a number-of-turns similarity metric, and a turn-angle similarity metric.

* * * * *